2,929,825

HALOGENATED OXYNAPHTHOTETRALONES

Charles R. Stephens, Jr., Niantic, Conn., assignor to Chas. Pfizer & Co., Inc., New York, N.Y., a corporation of Delaware No Drawing. Application May 8, 1958
Serial No. 733,841

5 Claims. (Cl. 260—351)

The present invention is concerned with a new class of organic compounds having outstanding antimicrobial activity and stability to air oxidation, adapting them particularly for a variety of industrial applications where bacterial and mycotic attack is a problem.

The compounds of the present invention are those having the following structure and the alkali metal salts thereof

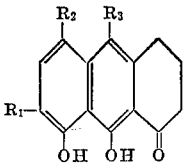

wherein the groups $R_1$, $R_2$, and $R_3$, are hydrogen atoms or halogen atoms. One, two, or all three of these groups may be chlorine or bromine atoms, but in any event, at least one of these groups is a chlorine or bromine atom. These materials are prepared by the chlorination or bromination of oxynaphthotetralone under relatively mild conditions. Oxynaphthotetralone is a shortened name used to describe 8,9-dihydroxy-3,4-dihydro-1(2)-anthracenone which has the following structure.

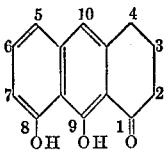

Oxynaphthotetralone is prepared by the catalytic hydrogenation of 1,8-dihydroxy-9(10)-anthracenone. Such a process is described in co-pending application Serial Number 370,231, filed July 24, 1953, now Patent No. 2,841,596, issued July 1, 1958.

The products of the present invention are prepared by methods known to those skilled in the art to be suitable for the bromination or chlorination of phenolic compounds. The halogen atoms of the products are attached to aromatic nuclear carbon atoms of the oxynaphthotetralone. Related oxynaphthotetralones halogenated only in the cyclohexanone ring are specifically excluded. It has been found that by limiting the quantity of halogenating agent, when employing an agent known to be capable of the chlorination or bromination of an aliphatic ketone, that halogen is introduced into the aromatic nucleus at the 5, 7, or 10 positions preferentially. If it is desired to prepare a monochloro- or monobromooxynaphthotetralone, molecular equivalents of the reactants are employed. Similarly, if the di- or tribromo-compounds are desired, two or three molecular equivalents of the halogenating agent per mole of oxynaphthotetralone are employed.

Bromine dissolved in an inert organic solvent is a suitable brominating agent for the preparation of the present compounds. Suitable solvents include chloroform, carbon tetrachloride, nitrobenzene, carbon disulfide, etc. Preferably, a solvent in which the oxynaphthotetralone is appreciably soluble is selected. The lower halogenated aliphatic liquid hydrocarbons are satisfactory. The dioxane-bromine complex, and the pyridine-bromine complex, are also satisfactory brominating agents.

Chlorine dissolved in the above solvents can be employed similarly as a reagent for preparation of the chloro compounds of the present invention. Chlorinating and brominating agents not depending on the elemental halogen are also satisfactory. These include sodium hypochlorite, t-butyl hypochlorite, sulfuryl chloride, and the corresponding bromine compounds.

When using bromine or chlorine and an inert organic solvent for the halogenation of oxynaphthotetralone, it is preferred to operate at a temperature of from about 0° C. up to about 50° C. At temperatures above room temperature, however, difficulty is frequently encountered due to the decreased solubility of the halogen in the solvent medium. There is also some tendency for oxidation of the oxynaphthotetralone to occur at high temperatures in the presence of the halogenating agent. When the halogenating agent embodies the halogen in combined form, as in sulfuryl chloride or sodium hypochlorite, the higher temperatures are perfectly satisfactory, and, in fact, are preferred. In any event, it is not desirable to exceed about 50° C due to the possibility of halogenating in the cyclohexanone ring or of oxidizing the oxynaphthotetralone. Since this is an aromatic substitution reaction, hydrogen halide is evolved as a by-product, and provision for its removal must be made. Hydrogen halide evolution provides a convenient guide to the course of the reaction. Evolved hydrogen halide can be absorbed in water and titrated acidimetrically, or, in large scale commercial operation, suitable metering devices can be employed.

Specific procedures for the preparation of a number of the compounds of the present invention are to be found at the end of this specification. A dibromo compound, in which the bromine atoms are believed to be located at the 5- and 10-positions, is prepared by treatment at room temperature of oxynaphthotetralone with two molar proportions of bromine dissolved in carbon tetrachloride. Drop-wise addition of the bromine to the carbon tetrachloride solution of the oxynaphthotetralone over a period of about one hour is employed. The dibromo derivative crystallizes from the reaction mixture. This product is useful as such or it can be further halogenated to provide other useful products of the present invention. For further halogenation, it is desirable to operate somewhat above room temperature, and to select a solvent in which the dibromooxynaphthotetralone is more soluble than it is in carbon tetrachloride. The third halogen introduced can be either a chlorine or bromine atom.

Monobromooxynaphthotetralone is prepared in a similar fashion by limiting the quantity of bromine to an equimolar proportion with respect to the oxynaphthotetralone. The monobromo product can be further chlorinated or brominated as desired, and it is also useful as such for its antimicrobial properties.

As further illustrated hereinafter, the chloro compounds are conveniently prepared by treatment of oxynaphthotetralone, in carbon tetrachloride solution, with one, two, or three molar proportions of sulfuryl chloride. The quantity of chlorinating agent selected depends upon whether it is desired to prepare a mono-, di-, or trichloro compound. Each of these chlorination products is useful as such. The mono- and dichloro compounds can also be brominated as described above.

The most active positions of the oxynaphthotetralone molecule for chlorination and bromination under conventional aromatic substitution conditions as limited herein are the 5-, 7-, and 10-positions. When preparing the mono- and dibromo derivatives, mixtures of position isomers wherein the halogens are in the 5-, 7-, or 10-positions are sometimes obtained. This is indicated by the wide melting point range observed. This is particularly evident in the case of the monobromo derivative. Mixtures of isomers are equally as useful as the pure materials for antimicrobial uses. A mixture of isomers is sometimes obtained in preparing dibromooxynaphthotetralone in which the principal component melts at about 218–220° C. and appears to be the 5,10 dibromo compound. The lower melting material compound, M.P. ca. 172–174° C., is thought to be the 7,10-dibromooxynaphthotetralone.

The dibromo compounds exhibits typical hydroxyl absorption in the infrared region of the spectrum. When the crude dibromo compound is nitrated, a mononitrodibromooxynaphthotetralone is obtained in which the infrared hydroxyl absorption is absent. This observation is consistent with the 5,10-bromo structure proposed since only if the nitro group occupies the 7-position, adjacent to the phenolic 8-hydroxyl possible which would account for neutralization of the hydroxyl absorption in the infrared. The effect of the 9-hydroxyl group, of course, is neutralized in both starting material and product by hydrogen bonding with the ketone group in the 1-position.

The possibility that halogenation, employing the limited quantities of reagent and moderate temperatures as is described herein, occurs in the cyclohexanone ring α to the keto group, that is at the 2-position, is excluded in a twofold manner. First, the present halogenated oxynaphthotetralones fail to give a positive test for halogen with sodium iodide and acetone, a test known to provide positive results for the α-halo ketones. Second, a sample of authentic 2-bromo derivative was prepared by an alternative route involving bromination of the enolacetate of 8,9-diacetoxyoxynaphthotetralone, and hydrolysis of the three acetyl groups. The product proved to be different from the bromo derivative obtained under aromatic substitution conditions with regard to stability, biological activity, and infrared absorption. The 2-bromooxynaphthotetralone exhibited much lower antimicrobial activity, and gave a positive test with sodium iodide in acetone in contrast to the compounds of the present invention.

The halogenated products of the present invention have unexpected advantages over oxynaphthotetralone itself in that they are more active against a wide variety of microorganisms, including Gram-positive and Gram-negative bacteria and fungi. The present substances are also more soluble in the nonpolar organic solvents, the so-called fat solvents than is oxynaphthotetralone, and are substantially more stable to air oxidation. These features are particularly desired properties for protective agents in surface coatings, etc. Their stability and solubility suits them for incorporation into oil base paints, and into plastic composition which are intended for molding into a variety of products and sheet materials. Due to their extremely high activity, low concentrations of the materials can be employed for these purposes. In general, less than one part per million is satisfactory, and seldom is it necessary to exceed 10 parts per million. The preferred concentration is generally from about 0.1 to 10 p.p.m. The present halogenated oxynaphthotetralones also have useful anthelmintic activity.

The remarkable stability of the present materials to air oxidation suits them in addition, to use in certain types of pharmaceutical and cosmetic formulations such as solutions and lotions to which the related non-halogenated products are not adapted due to their sensitivity to oxidation. Again, the above-concentration range is operative, but in some instances it is desirable to employ somewhat higher concentrations of up to about 1%.

The antimicrobial activities of three typical products of the present invention against a wide variety of pathogenic microorganisms are provided in Table I. These products also are active against a variety of microorganisms which are resistant to the antibiotics of clinical importance. These values are arranged in Table II. The symbol pi indicates that growth inhibition at the concentration given is not complete. These values are arranged in Table II.

TABLE I

*Inhibitory concentrations*

| Organism | Minimum Inhibitory Concentrations (mcg./ml.) | | |
|---|---|---|---|
| | Monobromooxynaphthotetralone (Example II) | Dibromooxynaphthotetralone (Example I) | Chlorooxynaphthotetralone (Example VI) |
| | M.P. 208–210° C. | | |
| Micrococcus pyogenes var. aureus | 0.19 | 0.19 | 0.19 |
| Streptococcus pyogenes | 0.19 pi | 0.19 pi | 0.19 |
| Streptococcus faecalis | 0.19 | 0.19 | 0.19 |
| Diplococcus pneumoniae | 0.39 pi | 0.19 | 0.19 |
| Erysipelothrix rhusiopathiae | 0.19 | 0.19 | 0.19 |
| Corynebacterium diphtheriae | 0.19 | 0.19 | 0.19 |
| Listeria monocytogenes | 0.39 | 1.56 | 0.19 |
| Bacillus subtilis | 0.19 | 0.19 | 0.19 |
| Clostridium perfringens | 0.19 | 0.19 | 0.19 |
| Lactobacillus casei | 0.78 pi | 0.78 | 1.56 |
| Saccharomyces cerevisiae | 12.5 | 12.5 | 1.56 |
| Bacterium ammoniagenes | 0.19 | 0.19 | 0.39 |
| Candida albicans | 6.25 | 6.25 pi | 3.12 |
| Mycobacterium berolinense | 0.19 | 0.39 | 0.39 |
| Mycobacterium 607 | 0.19 | 0.19 | 0.39 |
| Pityrosporum ovale Traub | 0.19 | 0.19 | 0.19 |
| Pityrosporum ovale 12078 | 0.19 | 1.56 | 12.5 |
| Aerobacter aerogenes | 50 | 50 pi | 3.12 |
| Escherichia coli | 25 | 50 | 6.25 |
| Proteus vulgaris | 100 pi | 100 | 100 pi |
| Pseudomonas aeruginosa | 100 | 100 | 100 |
| Salmonella typhosa | 3.12 pi | 3.12 pi | 1.56 |
| Klebsiella pneumoniae | 25 | 50 | 6.25 |
| Neisseria gonorrheae | 1.56 | 12.5 | 100 |
| Hemophilis influenzae | 0.19 | 0.19 | 0.19 |
| Phytomonas tumefaciens | 0.19 | 0.19 | 6.25 |
| Erwinia amylovora | 50 | 100 | 12.5 |
| Shigella sonnei | 50 | 25 pi | 1.56 |
| Malleomyces mallei | 25 | 12.5 pi | 25 |
| Vibrio comma | 0.19 | 0.39 | 0.19 |
| Brucella bronchiseptica | 0.19 | 0.78 | 0.78 |
| Salmonella pullorum | 12.5 | 25 | 1.56 |
| Desulfovibrio desulfuricans | 0.19 | 0.78 | |
| Pasteurella multocida | 0.19 | 0.78 | 0.39 |

TABLE II

*Inhibitory concentrations for antibiotic resistant species*

| Organism | Minimum Inhibitory Concentration (mcg./ml.) | | |
|---|---|---|---|
| | Monobromooxynaphthotetralone (Example I) | Dibromooxynaphthotetralone (Example II) | Chlorooxynaphthotetralone (Example VI) |
| | M.P. 208–210° C. | | |
| Micrococcus pyogenes var. aureus 376 | 0.78 | 0.78 | 0.19 |
| Micrococcus pyogenes var. aureus M/r | 0.78 | 0.19 | 0.19 |
| Micrococcus pyogenes var. aureus 376 | 0.78 | 0.78 | 0.19 |
| Micrococcus pyogenes var. aureus M/r | 0.78 | 0.19 | 0.19 |
| Micrococcus pyogenes var. aureus P/r | 0.19 pi | 0.19 | 0.19 |
| Micrococcus pyogenes var. aureus M/l | 0.19 | 0.78 | 0.19 |
| Micrococcus pyogenes var. aureus M 2 | 0.19 | 1.56 | 0.19 |
| Micrococcus pyogenes var. aureus M 12 | 0.19 | 0.78 | 0.19 |
| Micrococcus pyogenes var. aureus M 13 | 1.56 | 0.19 | 0.19 |
| Micrococcus pyogenes var. aureus 400 | 1.56 | 0.78 | 0.19 |
| Micrococcus pyogenes var. aureus 11o/r | 0.19 pi | 0.19 | 0.19 |
| Micrococcus pyogenes var. aureus 93/r | 0.19 | 0.19 | 0.19 |
| Micrococcus pyogenes var. aureus 105/r | 0.19 | 0.19 | 0.19 |
| Micrococcus pyogenes var. aureus 122/r | 0.19 | 0.19 | 0.19 |

Each of the products of the present invention is a novel material. They are generally obtainable as crystalline compounds having characteristic melting points and absorption spectra. They are slightly soluble in most of the common organic solvents, being more soluble in the non-polar solvents. Their alkali metal salts may be formed. The alkali metal salts possess substantially the same biological activity and stability as the parent compounds, but they are more soluble in water. The sodium and potassium salts are adapted to use in antiseptic soaps. They also form coordination complexes with a wide variety of polyvalent metals. The present halogenated oxynaphthotetralones are useful as sequestering agents, and due to the organic solvent solubility of many of their metal chelates, they can be used, in conjunction with appropriate solvents, to remove various metallic ions from aqueous solution by solvent extraction. Chelates are formed with copper, nickel, iron, calcium, magnesium, and a number of other metals.

The solubility of the halogen compounds of the present invention is such that they can be advantageously used in the form of solutions in industrial antimicrobial applications such as the treatment of cloth, rubber, or other fiberous articles. It is preferred, for this use, to apply the fungicide dissolved in a volatile solvent. After application to the material, the volatile solvent evaporates leaving the antimicrobial agent impregnated throughout the surface of the article. Applying these agents to smooth surfaces, as for example in treating wooden surfaces for protection against microbial attack, or to inhibit fungus growth on damp concrete surfaces, a solution may be most practically applied by brushing, spraying, or dipping. For this purpose, they can also be conveniently incorporated into paints and lacquers due to their solubility in the oil soluble solvents. They can be incorporated during the manufacture of the paint or lacquer or added just prior to use by dissolving an appropriate quantity in a suitable solvent such as turpentine, ethyl acetate, methyl isobutylketone, toluene, or benzene, and mixing the solvent concentrate with the paint or lacquer. The amount of the halooxynaphthotetralone is selected so as to provide a concentration of from 0.1 to 10 parts per million on a weight basis.

These substances are also effective in protecting so-called emulsion type paints, which comprise a water emulsion of an oil, pigment, and coating vehicle, from microbial attack. Upon standing exposed in the container to atmospheric conditions, such paints are sometimes subject to fungal attack resulting in the breaking of the emulsion and rendering the paint generally unfit for use. Other examples of applications for the halooxynaphthotetralones are in the mildew proofing of lumber, and plastics, particularly vinyl-type plastics, preservatives for paper to prevent slime mold attack, and particularly cardboard containers subjected to high temperatures and humidities. They are also useful for incorporation into cutting oils to prevent bacterial and fungal attack thereon. They are particularly suited for this purpose due to their high oil solubility and their stability to oxidation.

Having now described the manner in which the present invention is to be practiced, the following examples are provided as specific illustrations of methods for the preparation of the novel halooxynaphthotetralones. These examples, however, are not intended to limit the scope of the invention which is defined by the appended claims.

EXAMPLE I

Oxynaphthotetralone, 22.8 (0.1 mole), and 200 ml. of carbon tetrachloride are stirred together at room temperature and treated with 32 g. (0.2 mole) of bromine in a drop-wise fashion during a period of about 1 hr. The reaction mixture is allowed to stir at room temperature overnight. A heavy orange mush-like slurry of crystalline material results. This product is collected, washed with ether, and dried. It weighs 26.7 g. It is recrystallized from ethyl acetate providing dibromooxynaphthotetralone, M.P. 208–210° C. This is probably a mixture which is largely the 5-10-dibromo compound and a smaller amount of an isomer involving the 5, 7 or 10 positions.

*Analysis.*—Calcd. for $C_{14}H_{10}O_3Br_2$: C, 43.55, H, 2.67, Br. 41.5. Found: C, 43.77; H, 2.73; Br, 39.6.

This material exhibits typical hydroxyl absorption in the infrared region of the spectrum at about $3.0\mu$ and fails to give a positive test for halogen with sodium iodide in acetone (Shriner and Fuson, "Identification of Organic Compounds," Third Edition, John Wiley and Sons, New York, New York, 1948, page 140). Nitration of this dibromo compound with concentrated $HNO_3$ in acetic acid yields a mononitro derivative in which the $3.0\mu$ infrared hydroxyl bond is absent. This is consistent with a structure assignment of the original dibromo compound as being largely 5,10-dibromo-8,9-dihydroxy-3,4-dihydro-1(2H)-anthracenone.

Two additional recrystallizations of the dibromo product from chloroform-isopropanol raises the melting point of 218–220° C., but does not significantly change infrared absorption or composition. This is consistent with the removal of an isomeric dibromo compound from the crude.

The filtrate from the ethyl acetate recrystallization, first carried out, is evaporated to dryness, and the residue twice recrystallized from acetonitrile. The resulting product melts at 172–174° C. when heated in a capillary tube, and exhibits infrared absorption similar to the 218–220° C. melting material with the following major differences: the maxims at 7.03, 7.37, and $8.05\mu$ are absent, those at 9.93, and 11.30 are much less intense, and absorption occurs at $12.30\mu$ where no maximum was previously noted.

*Analysis.*—Calcd. for $C_{14}H_{10}O_3Br_2$: C, 43.55; H, 2.67; Br, 41.5. Found: C, 43.74; H, 2.72; Br, 41.6.

The wave lengths of infrared absorption maxims are listed in Table III for the isomeric dibromooxynaphthotetralones. Both materials exhibit similar antibacterial, and antifungal activity, and are active against pinworm (*S. obvelata*) in mice.

TABLE III

*Principal wave lengths ($\mu$) of maximum absorption of isomeric dibromooxynaphthotetralones*

| M.P. 218-220° C. | M.P. 172-174° C. |
| --- | --- |
| 3.03 | 3.03 |
| 3.42 | 3.42 |
| 6.16 | 6.16 |
| 6.28 | 6.28 |
| 7.03 | --- |
| 7.10 | 7.10 |
| 7.25 | 7.28 |
| 7.37 | --- |
| 7.48 | 7.48 |
| 7.73 | 7.73 |
| 8.05 | --- |
| 8.52 | 8.42 |
| 8.95 | 9.00 |
| 9.93 | 9.93 |
| 10.60 | 10.65 |
| 11.30 | 11.28 |
| --- | 12.30 |

EXAMPLE II

The process of Example I is repeated employing 0.1 mole of bromine. A small amount of the insoluble dibromooxynaphthotetralone is filtered, and the product recovered by evaporation of the carbon tetrachloride filtrate. The crude product is recrystallized from ethanol and found to have a melting point of 95 to 108° C. This analysis corresponds substantially to the monobromo derivative, but the wide melting point range indicates that a mixture of isomers is presumably obtained. The product exhibits typical hydroxyl infrared absorption, and fails to give a positive test for halogen with sodium iodide in acetone.

EXAMPLE III

The process of Example II is repeated substituting chlorine for bromine.

EXAMPLE IV

The process of Example II is repeated substituting chloroform, tetrachloroethane, ethylene dichloride, and ethylene dibromide for the carbon tetrachloride.

EXAMPLE V

Trichlorooxynaphthotetralone is prepared by employing 0.3 mole of chlorine in the procedure of Example II.

EXAMPLE VI

Oxynaphthotetralone, 22.8 (0.1 mole), is dissolved in 150 ml. of carbon tetrachloride and stirred at room temperature while being treated with 1 equivalent (approximately 9 ml.) of sulfuryl chloride. The material warms slightly during the addition. The mixture is kept at 35° C. for about ½ hour, and then warmed on a steam bath at 50° C. for 15 minutes. The mixture is stripped of HCl, and sulfur dioxide gas in vacuo at 40° C., the solution concentrated, and the crystalline product collected. It is recrystallized from ethanol to provide crystalline monochlorooxynaphthotetralone. This product exhibits typical infrared absorption and fails to give a test for halogen with sodium iodide in acetone.

EXAMPLE VII

The procedure of Example VI is repeated substituting two equivalents of sulfuryl chloride for the 1 equivalent employed in that example. The mixture is heated at 50° C. for two hours after addition of the sulfuryl chloride is complete. The solvent is removed and the residue leached with four 300 ml. proportions of ether. The insoluble materials are removed and the combined ether extracts evaporated to a small volume providing 12.5 g. of an orange crystalline material. It is collected, washed, and dried. This is relatively pure dichlorooxynaphthotetralone.

EXAMPLE VIII

Approximately 50 mg. of dibromo-8,9-dihydroxy-3,4-dihydro-1(2H)-anthracenone (Example I, M.P. 218–220° C.) is dissolved in 25 ml. of turpentine and the solution is added to one gallon of a conventional oil base paint. The paint and turpentine solution are thoroughly blended. Paint treated in this fashion is resistant to bacterial and fungal attack and provides coatings resistant to bacterial and mycotic attack when used in the conventional manner.

EXAMPLE IX

A vinyl chloride-vinylacetate copolymer powder (VYNW Vinylite), 40 parts by weight, and 60 parts by weight of dioctyl phthalate containing 0.001 part by weight of the dichlorooxynaphthotetralone of Example VII are blended by milling a conventional two roll rubber mill heated at about 140° C. The resulting elastomeric composition is found to be extraordinarily mildew and microbially resistant as compared to a similar composition containing none of the chloronaphthotetralone.

EXAMPLE X

Dibromo - 8,9 - dihydroxy - 3,4 - dihydro - 1(2H)-anthracenone, M.P. 218–220° C. 3.9 g., and 50 ml. of ethanol is treated with an ethanolic solution containing 1.0 g. of sodium ethoxide, and the mixture refluxed with stirring for 1 hr. The resulting bright yellow crystalline monosodium salt is collected on a filter, washed with ethanol and dried.

EXAMPLE XI

The process of Example X is repeated substituting 1.3 g. of potassium ethoxide for the sodium ethoxide to provide the monopotassium salt.

What is claimed is:

1. A compound selected from the group consisting of those having the formula

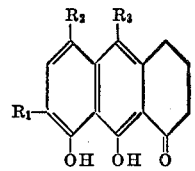

wherein $R_1$, $R_2$, and $R_3$ are selected from the group consisting of hydrogen, chlorine, and bromine and at least one of $R_1$, $R_2$, and $R_3$ is one of said halogens, and the alkali metal salts thereof.

2. Dibromo - 8,9 - dihydroxy - 3,4 - dihydro - 1(2H)-anthracenone of the formula of claim 1 and having M.P. 218–220° C.
3. The monosodium salt of the product of claim 2.
4. The monopotassium salt of the product of claim 2.
5. Dibromo - 8,9 - dihydroxy - 3,4 - dihydro - 1(2H)-anthracenone of the formula of claim 1 and having M.P. 172–174° C.

References Cited in the file of this patent
UNITED STATES PATENTS
2,841,596    Stephens  ---------------- July 1, 1958